US010215608B2

(12) United States Patent
Den Hartog et al.

(10) Patent No.: US 10,215,608 B2
(45) Date of Patent: Feb. 26, 2019

(54) SYSTEM FOR AND A METHOD OF MONITORING WATER DRAINAGE

(71) Applicant: PHILIPS LIGHTING HOLDING B.V., Eindhoven (NL)

(72) Inventors: Edith Danielle Den Hartog, Eindhoven (NL); Ralph Gertrude Hubertus Voncken, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 15/778,450

(22) PCT Filed: Nov. 15, 2016

(86) PCT No.: PCT/EP2016/077735
§ 371 (c)(1),
(2) Date: May 23, 2018

(87) PCT Pub. No.: WO2017/089181
PCT Pub. Date: Jun. 1, 2017

(65) Prior Publication Data
US 2018/0340812 A1    Nov. 29, 2018

(30) Foreign Application Priority Data

Nov. 24, 2015   (EP) ..................................... 15195974

(51) Int. Cl.
*G08B 21/00* (2006.01)
*G01F 23/00* (2006.01)
(Continued)

(52) U.S. Cl.
CPC ...... *G01F 23/0007* (2013.01); *G01F 23/0046* (2013.01); *G01F 23/14* (2013.01);
(Continued)

(58) Field of Classification Search
CPC .. G01F 23/0007; G01F 23/0046; G01F 23/14; G01F 23/24; G01F 23/2928; G08B 21/182
(Continued)

(56) References Cited

U.S. PATENT DOCUMENTS

2007/0208510 A1* 9/2007 Anderson ............... E02B 11/00
702/2
2009/0123340 A1* 5/2009 Knudsen ............ G01N 33/1886
422/105
(Continued)

FOREIGN PATENT DOCUMENTS

CN       104727423 A     6/2015
DE    102007030305 A1   11/2008
(Continued)

*Primary Examiner* — Naomi J Small
(74) *Attorney, Agent, or Firm* — Meenakshy Chakravorty

(57) ABSTRACT

A system (100) for and a method of monitoring water drainage is provided. The system for monitoring water drainage comprising a sensor interface (118), a storage (120), an atmospheric precipitation unit (130) and a signal generator (140). The sensor detects whether water is present at an associated surface (112) and generates a sensor signal (111). The storage stores water drainage information that relates to the associated surface and comprises characteristics of water presence on the associated surface in cases of atmospheric precipitation. The atmospheric precipitation unit receives recent atmospheric precipitation information. The signal generator i) obtains predicted water presence data by applying the water drainage information retrieved from the storage to the atmospheric precipitation information, ii) compares the sensor signal received from the sensor with the predicted water presence data, iii) generates a warning signal (151) indicating a problem with the water drainage if in the comparison a too large deviation is detected.

15 Claims, 4 Drawing Sheets

(51) Int. Cl.
 *G01F 23/24* (2006.01)
 *G01F 23/14* (2006.01)
 *G01F 23/292* (2006.01)
 *G08B 21/18* (2006.01)

(52) U.S. Cl.
 CPC .......... *G01F 23/24* (2013.01); *G01F 23/2928* (2013.01); *G08B 21/182* (2013.01)

(58) Field of Classification Search
 USPC ........................................................ 340/612
 See application file for complete search history.

(56) References Cited

U.S. PATENT DOCUMENTS

| | | | |
|---|---|---|---|
| 2009/0201123 A1 | 8/2009 | Kafry et al. | |
| 2011/0120561 A1* | 5/2011 | Quigley | E03F 1/00 137/1 |
| 2014/0117852 A1 | 5/2014 | Zhai et al. | |
| 2016/0115675 A1* | 4/2016 | Quigley | E03B 1/042 700/282 |
| 2018/0101826 A1 | 4/2018 | Hultermans et al. | |

FOREIGN PATENT DOCUMENTS

| | | |
|---|---|---|
| DE | 102008063564 A1 | 6/2010 |
| GB | 2220012 A | 12/1989 |
| WO | 2015106949 A1 | 7/2015 |

\* cited by examiner

SYSTEM FOR AND A METHOD OF MONITORING WATER DRAINAGE

CROSS-REFERENCE TO PRIOR APPLICATIONS

This application is the U.S. National Phase application under 35 U.S.C. § 371 of International Application No. PCT/EP2016/077735, filed on Nov. 15, 2016, which claims the benefit of European Patent Application No. 15195974.9, filed on Nov. 24, 2015. These applications are hereby incorporated by reference herein.

FIELD OF THE INVENTION

The invention relates to a system for monitoring water drainage.

The invention further relates to a method of monitoring water drainage and a computer program product for monitoring water drainage.

BACKGROUND OF THE INVENTION

Maintenance of the water drainage network in a city or village is mainly based on long term plans which define when elements of the water drainage network must be replaced or maintained. If central elements in the water drainage network fail, this is often automatically detected by means of sensors that continuously sense the operation of the central elements and such failures are often prevented by regular maintenance that is defined in the (long term) maintenance plans. However, the water drainage network has also a lot of decentralized elements.

Published Chinese patent application CN104727423A describes a system for controlling the operation of controllable elements of a water drainage network, such as pumps, valves or even controllable weirs. The system tries to control those elements as best as possible such that water is drained away without causing any problems. The system may also use information obtained from traffic cameras. Although this system tries to prevent problems with the water drainage in a city by controlling controllable elements of the water drainage network, the system is not meant for and is not able to detect whether some elements, such as passive decentralized elements, are not operating according to expectations.

SUMMARY OF THE INVENTION

The water drainage network has a lot of decentralized elements, such as sinks, manholes and storm drains/sewers provided at, for example, public roads and parking places. In general, these decentralized elements are not automatically monitored and when such a decentralized element fails, the party that manages the water drainage network only knows this when the public informs this party about resulting problems. Problems are often not reported and in most cases this leads to more severe problems on the short and middle long term. There is a need for a better detection or reporting system of problems that relate to malfunctioning elements of the water drainage network.

It is an object of the invention to provide a system for monitoring water drainage such that problems can be detected more effectively.

For this purpose, according to an aspect of the invention, a system for monitoring water drainage as described in the claims is provided.

For this purpose, according to another aspect of the invention, a method of monitoring water drainage as described in the claims is provided.

For this purpose, according to a further aspect of the invention, a computer program product for monitoring water drainage as described in the claims is provided.

The system comprises a sensor interface, a storage, an atmospheric precipitation unit and a signal generator. The sensor interface obtains a sensor signal from a sensor. The sensor is configured to detect water presence at an associated surface and configured to generate a sensor signal indicative of water presence at the associated surface. The storage stores water drainage information relating to the associated surface. The water drainage information comprises characteristics of water presence on the associated surface due to atmospheric precipitation at the associated surface. The atmospheric precipitation unit obtains atmospheric precipitation information comprising information about recent atmospheric precipitation in the vicinity of the associated surface. The signal generator is coupled to the sensor interface, the storage and the atmospheric precipitation unit. The signal generator being configured to i) obtain predicted water presence data by applying the water drainage information retrieved from the storage to the atmospheric precipitation information received at from the atmospheric precipitation unit, ii) compare the sensor signal received from the sensor with the predicted water presence data, and iii) generate a warning signal indicating a problem with the water drainage in relation to the associated surface if in the comparison a deviation is detected between the sensor signal and the predicted water presence.

The measures of the system have the effect that in cases that the detected water on the associated surface is not predicted, a warning signal is automatically generated. The warning signal may be shown on a user interface of the system or the warning signal can be transmitted to people who have to maintain the water drainage network to inform them that there might be a problem with, for example, the decentralized water drainage elements located at or close to the associated area. Thereby problems with the water drainage are prevented because problems are detected on time and maintenance can be performed before larger problems occur. Furthermore, the system enables that road unsafe road conditions due to problems with the water drainage elements can be identified faster.

The system works on basis of known water drainage characteristics of the associated surface such as, for example, "given an amount of atmospheric precipitation, it takes on average a specific amount of time before the water is drained away"—this information is, for example, based on prior observations. Such known characteristics may also relate to characteristics of the associated surface, such as, for example, "a concrete surface with an angle of x degrees on which water flows into a specified direction" and information about the water drainage capacity available at an area to which the water flows. The atmospheric precipitation information is used while predicting the predicted water presence—it enables the system to make such prediction if it is known whether there was atmospheric precipitation and, optionally, when it is know how much atmospheric precipitation falls or fell on the associated surface. This information is obtained by the atmospheric precipitation unit. The atmospheric precipitation unit may optionally comprise an input interface that obtains the atmospheric precipitation information from an external source. The input interface can be coupled to a precipitation sensor or the input interface may be coupled to private or public data sources that provide information about recent atmospheric precipitation at the associated surface or an area near the associated surface. The atmospheric precipitation information relates to recent atmospheric precipitation in the vicinity of the associated surface, which means that the atmospheric precipitation information relates to recent atmospheric precipitation at and/or near the associated surface.

The sensor interface may obtain the sensor signal from an external sensor. Optionally, the system comprises the sensor and the sensor is coupled to the sensor interface for providing the sensor signal to the sensor interface.

Optionally, the system comprises an output interface coupled to the signal generator. The output interface provides the generated warning signal.

Optionally, the system comprises a plurality of sensors coupled to the sensor interface and the plurality of sensors are configured to detect whether water is present at associated surfaces, the sensors are individually associated with a respective associated surface. Additionally, the storage is for storing water draining information relating to the associated surfaces, the atmospheric precipitation unit is for receiving atmospheric precipitation information that comprises information about recent atmospheric precipitation at the associated surfaces and/or areas near the associated surfaces. Additionally, the signal generator is coupled to plurality of sensors and is configured to obtain the predicted water presence data for the associated surfaces, compare the sensor signals of the plurality of sensors with the predicted water presence data, and generate the warning signal if in the comparison a deviation is detected between one of the sensor signals and the predicted water presence. In this optional embodiment, the warning signal indicates a problem with the water drainage in relation to the associated surface where the deviation is detected. This optional embodiment enables the monitoring of, for example, water drainage elements that relate to the plurality of associated surfaces. Consequently, more problems can be detected earlier compared to situation wherein the public has to report possible water drainage problems.

This optional embodiment also enables the monitoring of more elements of the water drainage network that relate to the water drainage of group of associated surfaces. For example, a single sewer may transport water away from a group of storm drains of a group of associated surfaces. If subsequently a problem is detected with the water drainage at the associated surfaces of this, it indicates that the sewer may be constipated.

Optionally, the atmospheric precipitation unit is also coupled to the sensor interface and receives the sensor signals of the plurality of sensors. Thereby the atmospheric precipitation unit is capable of generating the atmospheric precipitation information without receiving external information about recent atmospheric precipitation. For example, if after a period of the absence atmospheric precipitation a group of sensors reports the presence of water on their respective associated surfaces, the atmospheric precipitation unit may be configured to conclude that it rains at the respective associated surfaces. If only a single sensor reports water presence, there is most probably no atmospheric precipitation and the water may originate from another source or it may be the result of a malfunctioning storm drain at or near the associated surface.

Optionally, the predicted water presence comprises at least one of: an expected duration of the presence of water on the associated surface, an expected amount of water being present on the associated surface, an expected amount of water being presented on the associated surface as a function of time. Optionally, the sensor is configured to detect an amount of water on the associated surface and the sensor signal indicates an amount of water being present at the associated surface. The prediction of the expected duration allows the detection of problems with the water drainage if water remains too long on the associated surface. For example, when there are pools on a street for a too long time, most probably one of the storm drains is constipated. The use of predicting the time before water is away from the associated surface implies that the problem can only be detected after the period of time that it costs to drain the water away under normal circumstances. By using the more advanced predicted water presence characteristics that also predict an amount of water on the associated and combining them with sensors that are also able to detect an amount of water on the associated surface, problems can be detected earlier and as such the scale of arising problems can be reduced by early actions undertaken by the party that receives the warning signals. For example, during a storm it may be detected that water is not drained away fast enough from a road. If, for example, the road is dangerous when even more water is present on that road, the system discussed in this document enables the party responsible for the road to decide early to close the road or at least to visit the road immediately to repair or maintain the storm drains.

Optionally, the storage of the system is also coupled to the sensor interface and the storage is configured to store a history of the sensor signal of at least one sensor. Optionally, the storage is also coupled to the atmospheric precipitation unit for receiving atmospheric precipitation information and the storage is configured to store a history of the atmospheric precipitation information. Optionally, the signal generator is configured to retrieve also history information from the storage and take this information into account in the obtaining of the predicted water presence data and the comparing of the sensor signal with the predicted water presence data. By storing the information of the sensor signal or sensor signals for different moments in time and/or storing the atmospheric precipitation information for different moments in time, the signal generator is able to obtain more accurate predicted water presence data and the signal generator is able to better compare and detect whether a deviation is present between the sensor signal(s) and the predicted water presence. Furthermore, if no water draining problem is detected and storing the history of the sensor signal(s) and/or the atmospheric precipitation information, the system generates immediately water drainage information relating to the associated surface. This history can be regarded as empirical data indicating how soon water is drained away from the associated surface after a storm or empirical data indicating how much water is present on the associated surface in relation to a specific amount of atmospheric precipitation.

The atmospheric precipitation unit is further configured to obtain additional weather information in relation to the associated surface and/or of an area near the associated surface. The additional weather information is, for example, an air temperature, an amount of wind, a humidity, an atmospheric pressure, a sunshine duration, a sunshine intensity and/or an evaporation index such as for example the Standardized Precipitation Evapotranspiration Index (SPEI). This additional weather information assists the signal generator in better predicting water presence. For example, when it is very cold, the atmospheric precipitation will fall most probably as snow and only when the snow melts as the result of higher temperatures, water has to be drained away from the associated surface. After a cold period, the prediction of a period of time for the presence of water on the associated surface, or a prediction of an amount of water present on the associated surface, temperature information is very useful. If there is more wind, if the temperatures are relatively high and/or if the humidity is relatively low, the associated surface will dry faster because of more evaporation of the water from the associated surface.

Optionally, at least one sensor is arranged in or at the associated surface or is arranged remote from the associated surface. Remote means in this context: not in or at the associated surface and at least a minimum distance away from the associated surface, however, close enough to the associated surface for determining whether water presence at the associated surface. Examples of sensors that are arranged remote from the associated surface are: i) a camera for obtaining images of the associated surface and an image processing circuit for recognizing water on the associated surface in the obtained images; ii) a video camera for obtaining a video stream of the associated surface and a video processing circuit for recognizing water on the associated surface in the obtained video stream; iii) an infrared camera for obtaining infrared images and a processing circuit for detecting the presence of water based on temperature characteristics being present in the infrared images, iv) a light source in combination with a light sensor to measure the amount of reflected light and a detecting circuit for detecting the presence of water based on characteristics of the reflected light; v) a microphone for obtaining an audio stream of the environment of the associated surface and audio processing circuit for detecting the presence of water on the associated surface based on characteristics of sounds in the obtained audio stream. Examples of sensors that are arranged in or at the associated surface are: i) an electrical resistance sensor being provided in or at the associated surface and a detection circuit for detecting an electrical resistance of the associated surface and for detecting the presence of water on the associated surface based on characteristics of the detected electrical resistance of the associated surface; ii) a pressure sensor provided in or below the associated surface and a detection circuit for detecting a pressure on the associated surface and for detecting water present on the associated surface on basis of characteristics of the detected pressure on the associated surface; iii) a humidity sensor provided close to the associated surface for detecting the presence of water on the associated surface based on a detected humidity value.

Optionally, at least one sensor comprises a) a light source for emitting coded light; b) a driving circuit for providing a modulated power signal to the light source and for being positioned at a first location with respect to the associated surface, the modulated power signal being modulated according to a code; c) a light sensor for being positioned at a second location with respect to the associated surface and for detecting light reflected by the associated surface, the reflected light includes reflected coded light; d) a detection circuit for detecting the presence of water on basis of characteristics of detected reflected coded light.

For example, the coded light is switched on and off relatively fast such that the human naked eye cannot detect the on and off switching and the on and off switching is performed according to a pattern that is determined by the code. This optional embodiment is in particular useful when several light sources illuminate the associated surface or when a lot of environmental light is available. For example, the sensor or sensors are distributed over several different sensor positions. For example, the light source with driving circuit may be provided in first lighting pole that illuminates a part of, for example, a parking place and the light sensor and detection circuit are provided in a second lighting pole adjacent to the first lighting pole. Than the sensor is able to detect whether water is present in between the first lighting pole and the second lighting pole. The units of a plurality of sensors can be distributed over a plurality of lighting pole that are, for example, arranged in an array configuration of a parking place and thereby the sensors are able to detect along about the whole parking place whether there are problems with the water drainage.

Optionally, the system comprises an outdoor luminaire such as, for example, an outdoor lighting pole. The outdoor luminaire comprises at least one sensor. When the system comprises a plurality of sensors, the plurality of sensors may be provides and distributed over a plurality of outdoor luminaires. One outdoor luminaire may also have two or more sensors that detect the presence of water at associated surfaces located at difference directions with respect to the position of the outdoor luminaire. In this optional embodiment existing outdoor infrastructure is used and at these locations power is already available. Thereby the investments for placing the sensors at particular locations are reduced.

Optionally, if the system comprises a plurality of sensors, the system may also comprises one or more sensor signal transmitters and at least one sensor signal receiver that is coupled to the signal generator. Optionally, the plurality of sensors are distributed over and provided in a plurality of outdoor luminaires and the sensor signals are transmitted via the sensor signal transmitters towards the signal generator. The transmission of the sensor signals may be wirelessly or via a wired connection. Optionally the wired connection uses power line modems for transmitting the signals via power lines. This embodiment allows the integration of the sensors in, for example, the outdoor luminaires of a street illumination system or of a parking place illumination system without having the need to provide additional wires to the existing infrastructure for communicating the sensor signals to the signal generator. It is to be noted that the system may also have several sensor signal receives, for example, also every outdoor luminaire has a sensor. Thereby (wireless) connections can be formed between neighboring outdoor luminaires and together they may form a network that covers the whole outdoor illumination system. Then the sensor signals are transmitted via the different (wireless) connections towards the location where the signal generator is available.

Optionally, the storage further stores one or more importance characteristics in relation to the associated surface. The importance characteristics relates to how important a possible water drainage problem of the associated surface is. The signal generator obtains the importance characteristics from the storage. The signal generator takes into account the importance parameter in at least one of the comparison of the sensor signal with the predicted water presence data for determining whether a deviation is detected and/or the generation of the warning signal for optionally prioritizing the generation of the signal and optionally including an importance value in the generated warning signal. The importance characteristics may be value of which, for example, indicates that a water drainage problem at the associated surface is severe or not. The importance characteristics may also be values that relate, for example, to traffic values of the associated surface and thereby indirectly indicate how severe a water drainage problem of the associated surface is. The importance characteristics can be used to decide whether deviations between the predicted water presence and the sensor signal are too large or not, for example, a threshold level to decide whether the deviation is too large may depend on the importance characteristics. The importance characteristics may also be used to prioritize detected problems, in particular when the system receives sensor signals from several sensors for detecting the presence of water on several associated surfaces. The importance characteristics may also be provided in the warning signal such that the receiver of the warning signal is able to prioritize warning signal, in particular when the receiver receives in a short time several warning signals.

According to another aspect a method of monitoring water drainage is provided. The method comprises: i) receiving a sensor signal being generated by a sensor, the sensor being configured to detect whether water is present at an associated surface and to generate a sensor signal indicating whether water is present at the associated surface; ii) obtaining water drainage information relating to the associated surface, the water drainage information comprising characteristics of water presence on the associated surface in cases of atmospheric precipitation at the associated surface; iii) obtaining atmospheric precipitation information comprising information about recent atmospheric precipitation at least one of: the associated surface and an area near the associated surface; iv) determining predicted water presence data by applying the retrieved water drainage information to the received atmospheric precipitation information; v) comparing the received sensor signal with the predicted water presence data; and vi) generating a warning signal indicating a problem with the water drainage in relation to the associated surface if in the comparison a deviation is detected between the received sensor signal and the predicted water presence.

The method of monitoring water drainage has similar embodiments as the above discussed system for monitoring water drainage. The embodiments of the method have similar effects and advantages as the embodiments of the system.

According to a further aspect of the invention, a computer program product for monitoring water drainage is provided. The program is operative to cause a processor to perform the above discussed method monitoring water drainage. The program may comprise instructions which cause the processor, when the program being loaded into a computer comprising the processor, to perform the above discussed method monitoring water drainage.

Further preferred embodiments of the device and method according to the invention are given in the appended claims, disclosure of which is incorporated herein by reference.

BRIEF DESCRIPTION OF THE DRAWINGS

These and other aspects of the invention will be apparent from and elucidated further with reference to the embodiments described by way of example in the following description and with reference to the accompanying drawings, in which FIG. 1 schematically shows an embodiment of a system for monitoring water drainage, FIG. 2 schematically shows another embodiment of a system for monitoring water drainage, FIG. 3 schematically shows a street with a street lighting system in which one or more embodiments of a system for monitoring water drainage is provided, FIG. 4 schematically shows a method of monitoring water drainage, FIG. 5 schematically shows a computer program product.

The figures are purely diagrammatic and not drawn to scale. In the Figures, elements which correspond to elements already described may have the same reference numerals.

DETAILED DESCRIPTION OF EMBODIMENTS

Figure 1:
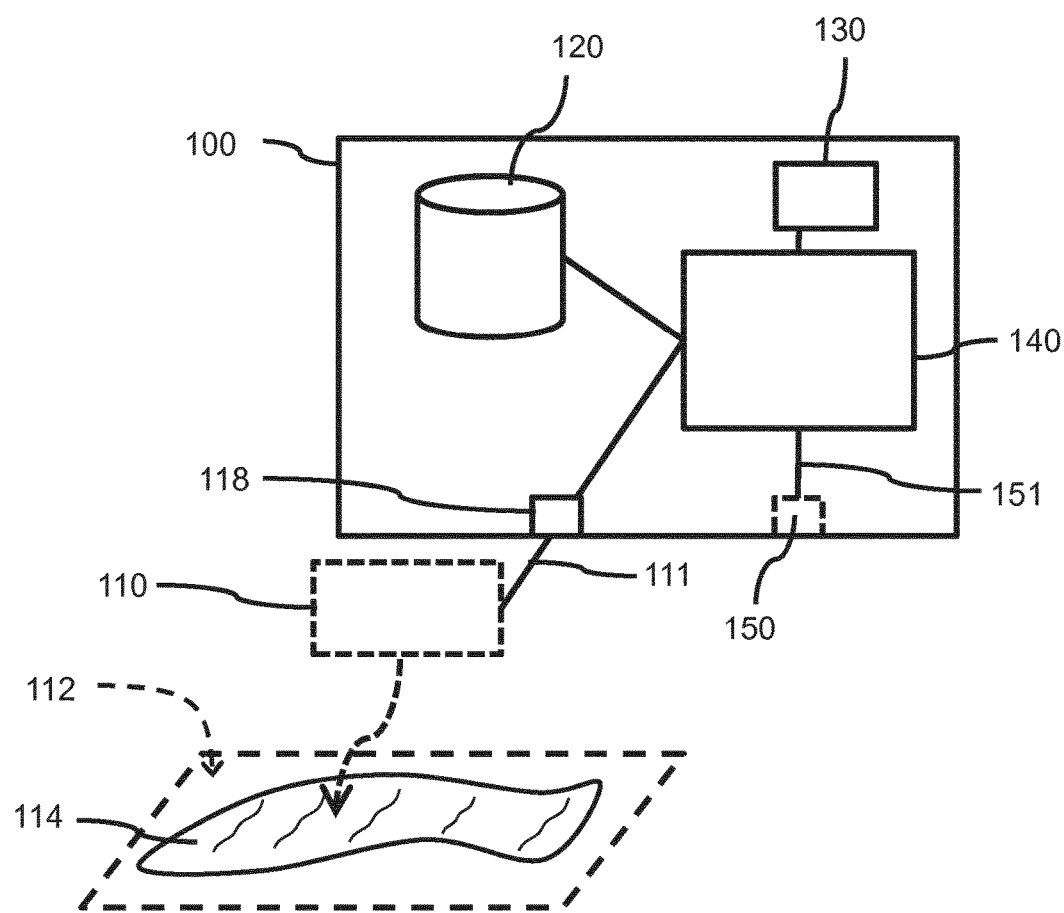

FIG. 1 schematically shows an embodiment of a system 100 for monitoring water drainage. The system 100 comprises a sensor interface 118, a storage 120, a signal generator 140, an atmospheric precipitation unit 130 and an optional output interface 150.

The sensor interface 118 is for receiving a sensor signal 111 from a sensor 110. In an embodiment, the system 100 also comprises the sensor 110. The sensor 110 is configured to detect water presence at an associated surface 112 and which is configured to generate the sensor signal 111 to indicate whether water 114 is present at the associated surface 112. The associated surface is nearby the sensor 110 and the sensor 110 is arranged with respect to the associated surface 112 at a position where it is able to detect whether there is water 114 on the associated surface 112. For example, if the sensor 110 comprises a camera, the camera is focused on the associated surface 112. If the sensor 110 is an electrical resistance sensor, then the sensor 110 will be arranged in the associated surface 112 to measure the electrical resistance of the associated surface 112 to detect changes in the electrical resistance when water is present at the associated surface 112. The sensor may have limited capabilities. In an example, the sensor is capable to distinguish between "water present at the associated surface 112" and "no water present at the associated surface 112". In other embodiments, the sensor is more advanced and is capable to sense or measure how much water is present at the associated surface 112. The amount of water present at the associated surface 112 may be expressed as a thickness of a water layer on the associated surface 112 or may be expressed as a volume of water present at the associated surface 112.

The storage 120 is configured to store water drainage information relating to the associated surface 112. The water drainage information relates to characteristics of a presence of water on the associated surface in cases of atmospheric precipitation at the associated surface. The water drainage information is information that allows the signal generator 140 to predict how long or how much water is most probably present at the associated surface 112 if it is known how whether and/or much water came down at the associated surface 112 and/or nearby the associated surface 112. For example, the water drainage information may be based on empirical data previously collected at atmospheric precipitation events. Thus, the water drainage information may relate to sensor data previously generated by the sensor and/or atmospheric data previously obtained. The water drainage information may also be derived from previously obtained sensor data and previously obtained atmospheric data. For example, the water drainage information may define a first period of time which length is the period of time during which water was present at the associated surface 112 when a first amount of atmospheric precipitation came down on the associated surface 112. It may also be stored that during a second period of time water was present at the associated surface 112 when a second amount of atmospheric precipitation came down. Other types of empirical data in relation to the presence of water may be stored as well. It is not necessary that the type of water drainage information that has been discussed in the previous sentences is based on empirical data. One may also obtain such data from simulations and/or calculations—for example, one may simulate or calculate how long it most probably takes before water is drained away from the associated surface 122 given a set of characteristics of the associated surface 112. Alternatively, or additionally, the water drainage information may also define water drainage characteristics of the associated surface 112, such as the water permeability of the associated surface 112, a slope of the associated surface 112 (which number relates to how fast water flows away), the presence of a storm drain at or near the associated surface 112, a water drainage capacity of the storm drain, the size of nearby surface which lies higher than the associated surface 112 and from which water flows towards the associated surface 112 when atmospheric precipitation comes down on the nearby surface, etc.

The atmospheric precipitation unit 130 is for obtaining atmospheric precipitation information that relates to recent atmospheric precipitation at the associated surface 112 and/or an area near the associated surface 112. For example, the atmospheric precipitation information defines how much rain fell on the associated surface and/or at is neighboring surfaces during the last 10 minutes and/or the last hour. For example, the atmospheric precipitation information defines how much rain currently falls on the associated surface. The atmospheric precipitation information allows the signal generator to calculate or predict, if also water drainage information of the associated surface 112 is known, to predict or calculate characteristics of the presence of water on the associated surface 112. The source of the atmospheric precipitation information may be a precipitation sensor being provide close to the associated surface 112, but may also be a third party who collects precipitation information (e.g. by means of radar) and distributes this information via a network, for example, via internet. Thus, the atmospheric precipitation unit 130 has characteristics to obtain the information from the source. If a precipitation sensor is used, the atmospheric precipitation unit 130 is coupled to the precipitation sensor and is configured to receive the signal generated by the precipitation sensor. If the atmospheric precipitation information is obtained from a third party via a network, the atmospheric precipitation unit 130 comprises a network interface and is configured to connect via the network to a server of the third party and retrieve the atmospheric precipitation information from the server. In this paragraph it is assumed that the recent atmospheric precipitation data may also relate to an area near the associated surface 112. It is not important how near this area is to associated surface and it is only important that the precipitation data of the area near the associated surface 112 provides a reliable indication of the amount of atmospheric precipitation at the associated surface. For example, if the associated surface 112 is in village X, the atmospheric precipitation information may relate to village X as whole or to, for example, the center of village X. In an embodiment, additional weather information in relation to the associated surface 112 and/or an area near the associated surface 112 may be received at the atmospheric precipitation unit 130. Such additional weather information is, for example, an air temperature, an amount of wind, a humidity, an atmospheric pressure, a sunshine duration and/or a sunshine intensity. It is to be noted that the atmospheric precipitation unit 130 may also determine the atmospheric precipitation information from data available in the system 100. In particular, as will be discussed in the context of FIG. 2, the system may comprise a plurality of sensors. Then, if, for example, a group of sensors start to report water presence at their associated surfaces after a period without atmospheric precipitation, the atmospheric precipitation unit may be configured to conclude that there was some recent atmospheric precipitation.

The signal generator 140 is coupled to the sensor interface 118 for receiving the sensor signal 111. The signal generator 140 is also coupled to the storage 120 to retrieve stored information. The signal generator 140 is coupled to atmospheric precipitation unit 130 to receive atmospheric precipitation information from the atmospheric precipitation unit 130.

The signal generator 140 is configured to obtain predicted water presence data by applying the water drainage information retrieved from the storage 120 to the atmospheric precipitation information received from the atmospheric precipitation unit 130. Thus, based on specific water drainage calculations, characteristics of water present at the associated surface 112 are predicted. The signal generator 140 may use, for example, a water drainage model which has input variables that are obtained from the storage 120 and the atmospheric precipitation unit 130. The signal generator 140 may also be configured to apply dedicated formulas that are specifically designed for applying the water drainage information to the atmospheric precipitation information to predict how much and/or how long water is present at the associated surface 112. In an example, the storage stores empirical data about the relation between recent atmospheric precipitation and the presence of water on the associated surface 112, and the signal generator 140 searches in this empirical data for events that match the currently received atmospheric precipitation and/or interpolates between different instances of the stored empirical data. Thus, the information stored in the storage 120, the information obtained via the atmospheric precipitation unit 130 and the specific way of calculating or predicting the water presence data together enable the obtaining of the predicted water presence data. Thus, the information stored in the storage 120, the information obtained via the atmospheric precipitation unit 130 and the specific way of calculating or predicting the water presence data are tuned to each other. In line with what has been discussed in the context of the sensor 110, the signal generator 140 may be able to predict whether it is expected whether water is present at the associated surface 112 or, in a more advanced embodiment, the signal generator 140 may be able to predict how much water is present at the associated surface 112 at a specific moment in time. The signal generator 140 may also predict a how much water is present at different moments in time and, thus, may create a timeline together with an expected amount of water on the associated surface. If the information received at the atmospheric precipitation unit 130 comprises also additional weather information, this additional weather information can be taken into account while obtaining the predicted water presence data. For example, the air temperature, the amount of wind, the humidity of the air near the associated surface may influence the water drainage because, for example, the amount of water that is evaporated instead of drained away is strongly influenced by these factors.

The signal generator 140 is also configured to compare the sensor signal 111 that is received at the sensor interface 118 from the sensor 110 with the predicted water presence data. In this comparison, the signal generator 140 detects whether there is a deviation between the data of the sensor signal 111 and the predicted water presence data and optionally detects whether the deviation is too larger, for example, when the deviation exceeds a threshold value or a predefined maximum deviation. For example, a threshold value may be exceeded when the predicted water presence data indicates that at the specific moment in time the associated surface 112 has to be dry and the sensor data obtained at that specific moment in time indicates that water is present at the associated surface 112. For example, a difference between a predicted amount of water present at the associated surface 112 at a specific moment in time and a measured amount of water at the associated surface 112 at that specific moment in time may be larger than such a threshold value. As indicated above, the predicted water presence data may relate to a future moment of time and then the comparison can only take place when the sensor 110 has detected the water presence at the associated surface 112 at or close to the future moment in time. The signal generator 140 may be configured to store the predicted water presence data in the storage for later use and retrieve the predicted water presence data at the moment in time at which the predicted water presence data becomes relevant.

The signal generator 140 is configured to generate a warning signal 151 that indicates a problem with the water drainage in relation to the associated surface if the comparison revealed a deviation, or optionally a too large deviation, between the sensor signal and the predicted water presence. The warning signal 151 is, for example, a binary signal that indicates whether there was a deviation, or, optionally, whether the deviation was too large or not. The warning signal 151 may also be a message which indicates around which time for which specific associated surface 112 a deviation was detected and, optionally, the height of the deviation may be communicated as well. The warning signal 151 may be used within the system 100, for example, for presenting a warning on an optional user interface of the system 100. Additionally, or alternatively, the warning signal is provided to an optional output interface 150 of the system 100. For example, an alarm system is coupled to the output interface 150 and the alarm system provides the warning signal to a water drainage network maintenance firm which is able to undertake necessary actions with respect to a possible constipated water drainage element of the water drainage network at or near the associated surface 112.

The signal generator 140 may be formed by dedicated hardware configured to execute the functions of the signal generator 140. In another embodiment, the signal generator 140 is a processor, for example, a general purpose processor that is programmed by means of a computer program that comprises instructions to cause the processor to perform the tasks of the signal generator 140.

The atmospheric precipitation unit 130 may comprise an interface for communication with external information sources. The atmospheric precipitation unit 130 may be formed by dedicated hardware configured to execute the function of the atmospheric precipitation unit 130. In another embodiment, atmospheric precipitation unit 130 is a processor, for example, a general purpose processor that is programmed by means of a computer program that comprises instructions to cause the processor to perform the tasks of the atmospheric precipitation unit 130. It is to be noted that the signal generator 140 and the atmospheric precipitation unit 130 may be combined in a single unit.

It is to be noted that the storage 120 may also be directly coupled to the sensor interface 118 and that the storage 120 may be configured to store instances of the sensor signal for different moments of time. For example, the value of the sensor signal is stored together with a time stamp. The storage 120 may also be directly coupled to the atmospheric precipitation unit 130 and the storage 120 may be configured to store instances of atmospheric precipitation information. For example, the received/retrieved atmospheric precipitation information is stored together with a timestamp. The stored sensor data and atmospheric precipitation information can be seen as empirical data that can be used to generate or calibrate, for example, the water drainage information stored in the storage 120. In an embodiment, the stored sensor data and/or atmospheric precipitation information may be retrieved by the signal generator 140 and may be used by the signal generator 140 to obtain the predicted water presence data and/or to compare the sensor signal with the predicted water presence data.

As discussed above, the sensor 110 is for detecting whether water is present at the associated surface 112. The sensor 100 may have several embodiments. The sensor 110 may be arranged in or at the associated surface 112 or the sensor 110 may be arranged remote from the associated surface 112. Remote means in this context: not in or at the associated surface 112 and at least a minimum distance away from the associated surface 112, however, close enough to the associated surface 112 for determining whether water presence at the associated surface 112. In an embodiment, the sensor 110 has a video camera and a video processing circuit. The video processing circuit may receive video images of the associated surface 112 from the video camera and may recognize water on the associated surface 112 with image/video recognition techniques. In an embodiment, the sensor 110 comprises an infrared camera that obtains infrared images of the associated surface 112 and comprises a processing circuit. The processing circuit obtains the images from the infrared camera. Infrared images are able to show temperature differences and temperature differences associated with water on the associated surface are recognized by the processing circuit. In an embodiment, the sensor 110 comprises a light source in combination with a light sensor. The light source emits light towards the associated surface 112 and the light sensor receives an amount of reflected light. In this embodiment the sensor 110 also comprises a detection circuit coupled to the light sources and differences in reflected light or patterns detected in the reflected light are used to sense whether water is present at the associated surface 112. In an embodiment, the sensor 110 comprises a microphone and an audio processing circuit to which the microphone is coupled. The audio processing circuit is configured to detect sounds relating to the presence of water on the associated surface. In an embodiment, the sensor 110 comprises an electrical resistance sensor that is provided in or at the associated surface 112 and comprises a detection circuit. The electrical resistance of the associated surface 112 is measured and the detection circuit detects changes in or specific values of the electrical resistance that relate to the presence of water on the associated surface. In an embodiment, the sensor 110 comprises a pressure sensor provided in or below the associated surface 112 and comprises a detection circuit coupled to the pressure sensor. The combination of the pressure sensor and the detection circuit are configured to detect a pressure on the associated surface 112 and to detect whether water is present on the associated surface 112 on basis of detecting a specific pressure or detecting specific pressure changes. In an embodiment, the sensor 110 comprises a humidity sensor provided close to the associated surface for detecting the presence of water on the associated surface based on a detected humidity value.

Specific embodiments of sensors can be found in the documents US202/0140233A1 and DE102008063564A1 which are incorporated by reference.

In another embodiment of the sensor 110, the sensor 110 comprises a light source and a driving circuit for providing a modulated power signal to the light source and wherein the driving circuit is configured to modulate the power signal according to a code such that a code is emitted with the light emitted by the light source. At least the light source is arranged at a first position with respect to the associated surface 112. In this embodiment, the sensor 110 also comprises a light sensor coupled to a detecting circuit wherein the detecting circuit is able to detect the presence of water on the associated surface 112 on basis of the amount of reflected light that comprises the code or patterns in the reflected coded light. At least the light source is arranged at a second different position with respect to the associated surface.

In an embodiment, the storage 120 further stores one or more importance characteristics in relation to the associated surface. The importance characteristics relates to how important a possible water drainage problem of the associated surface 112 is. The signal generator 140 obtains the importance characteristics from the storage 120. The signal generator 140 takes into account the importance parameter in at least one of the comparison of the sensor signal 111 with the predicted water presence data for determining whether a (too large) deviation is detected and/or the generation of the warning signal for optionally prioritizing the generation of the signal and optionally including an importance value in the generated warning signal 151. The importance characteristics may be value of which, for example, indicates that a water drainage problem at the associated surface is severe or not. The importance characteristics may also be values that relate, for example, to traffic values of the associated surface and thereby indirectly indicate how severe a water drainage problem of the associated surface is. The importance characteristics can be used to decide whether deviations between the predicted water presence and the sensor signal are too large or not, for example, a threshold level to decide whether the deviation is too large may depend on the importance characteristics. The importance characteristics may also be used to prioritize detected problems, in particular when the system receives sensor signals from several sensors for detecting the presence of water on several associated surfaces. The importance characteristics may also be provided in the warning signal such that the receiver of the warning signal is able to prioritize warning signal, in particular when the receiver receives in a short time several warning signals.

In an embodiment, the signal generator 140 may also be able to detect how severe the problem with the water drainage of the associated surface 112 is. For example, it the signal generator 140 may detect that water is draining away, but at a lower speed than expected. In such a situation the severity of the problem may be assessed as "not very high". For example, it the signal generator 140 may detect that no water is drained away and that only natural causes (infiltration and evaporation) contribute to the reduction of the amount of water on the associated surface 112. Then the severity of the problem may be classified as "high". The detected severity value may be included in the warning signal to assist the receiver of the warning signal to prioritize the received warning.

Figure 2:
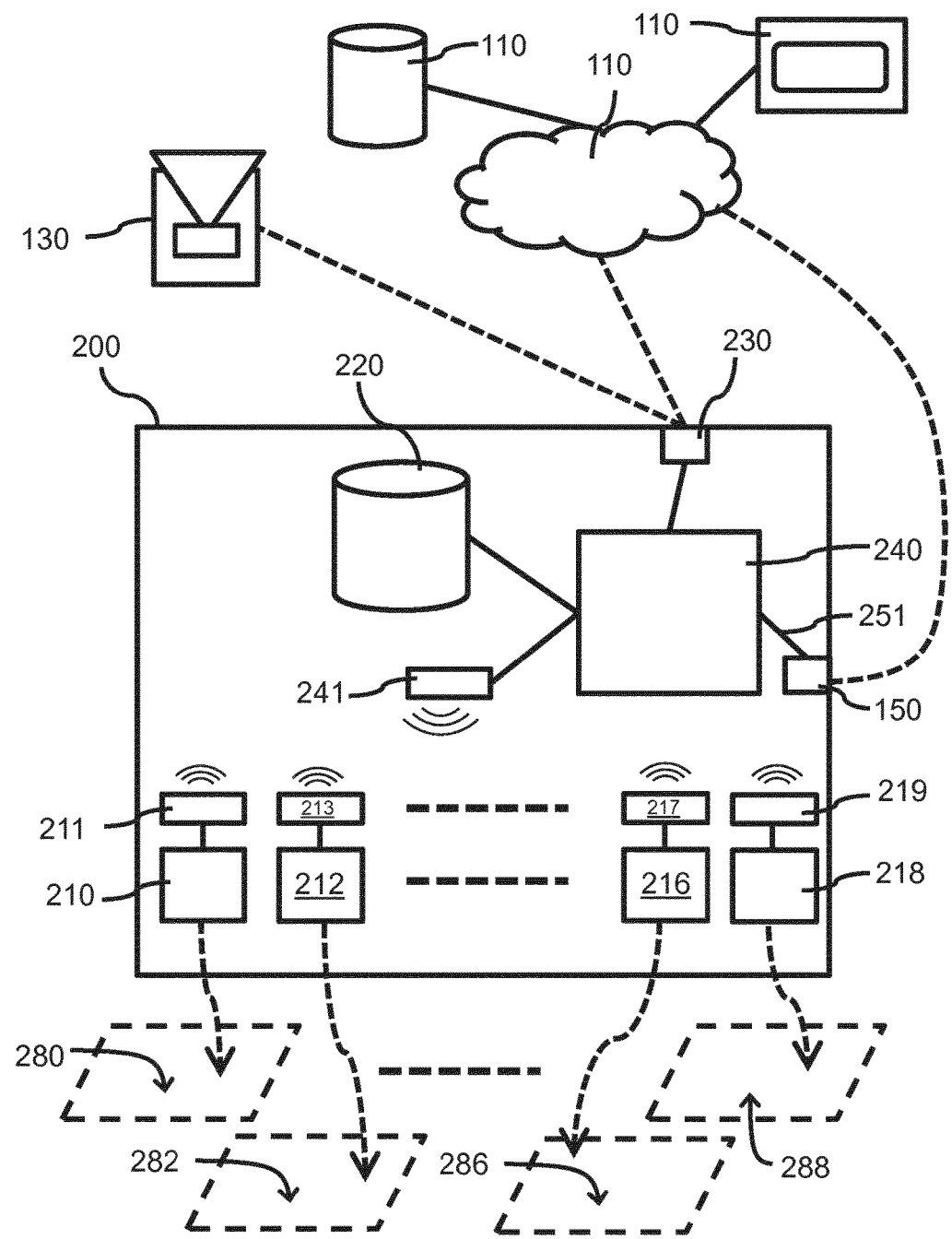

FIG. 2 schematically shows another embodiment of a system 200 for monitoring water drainage. The system 200 is similar to the system 100 of FIG. 1 and, unless explicitly discussed, elements of the system 200 have similar functions effects and/or embodiments as the corresponding elements of the system 100. In the system 200 a plurality of sensors 210, 212, 216, 218 are provided. The sensor interface is not drawn. In the system 200 the sensor interface is coupled to all the sensor 210, 212, 216, 218 and is provided in between the sensors 210, 212, 216, 218 and a signal generator 240. In the example of FIG. 2 four sensors 210, 212, 216, 218 are drawn, but embodiments of the system are not limited to this number of sensors 210, 212, 216, 218. Even more sensors may be provided or at least 2 sensors may be provided. Embodiments of the sensors 210, 212, 216, 218 are discussed above in the context of sensor 110. Different sensors 210, 212, 216, 218 are associated with different associated surfaces 280, 282, 286, 288. For example, sensor 212 detects whether water is present on associated surface 282. In an embodiment, the sensors 210, 212, 216, 218 are wirelessly connected to the signal generator 240 which means that the sensor signal is wirelessly transmitted towards the signal generator 240. For example, each sensor 210, 212, 216, 218 is coupled to a corresponding wireless transmitter 211, 213, 217, 219 that is capable of transmitting the sensor signals generated by respective sensors 210, 212, 216, 218. In the example of FIG. 2 there is one wireless receiver 241 that is coupled to the signal generator 240 and this wireless receiver 241 is capable of receiving all the transmitted sensor signals from the different sensors 210, 212, 216, 218. In other embodiments several sensors may also comprise a transceiver for receiving and transmitting sensor signals such that these transceivers can be positioned in between the receiver 241 of the signal generator 240 and a specific sensor that is positioned far away. Then the transceiver may receive the sensor signals of the specific sensor being positioned far away and may forward this sensor signal towards the signal generator 240. For example, an ad hoc network may be formed between the transmitters, transceivers and receiver allowing the coverage of a relatively large area. The network as a whole is configured to transmit the different sensor signals towards the signal generator 240. In another embodiment, the sensor signals are not transmitted wirelessly to the signal generator 240, but they may also be transmitted via wires. For example, power line modems can be used to transmit the sensor signals via power lines that provide power to the sensors 210, 212, 216, 218 and/or the signal generator 240.

The storage 220 is configured to store water draining information relating to the associated surfaces 280, 282, 286, 288. Thus, information is stored for the associated surfaces 280, 282, 286, 288 for which sensors 210, 212, 216, 218 are provided. The information allows the signal generator 240 to predict water presence data for the different associated surfaces 280, 282, 286, 288. Also the atmospheric precipitation unit 230 is slightly adapted such that it is able to receive atmospheric precipitation information in relation to recent atmospheric precipitation at the associated surfaces 280, 282, 286, 288 and/or areas near the associated surfaces 280, 282, 286, 288.

The signal generator 240 is coupled to the plurality of sensors 210, 212, 216, 218. As discussed previously this coupling can be by means of a direct wire or by means of the drawn wireless transmission techniques. The signal generator 240 is configured to obtain predicted water presence data for the associated surfaces 280, 282, 286, 288, compare the sensor signals of the plurality of sensors 210, 212, 216, 218 with the predicted water presence data, and generate the warning signal 251 if in the comparison a deviation is detected between one of the sensor signals and the predicted water presence data. The warning signal 251 indicates a problem with the water drainage in relation to the associated surface or to the associated surfaces for which the deviation is/are detected. It is to be noted that in the comparison predicted water presence data of a specific one of the associated areas 280, 282, 286, 288 is compared to one of the sensor signals of the sensors 210, 212, 216, 218 that relates to the same specific one of the associated areas 280, 282, 286, 288. The warning signal 251 is provided to the output interface 150.

As indicated in FIG. 2, the atmospheric precipitation unit 230 is capable of receiving atmospheric precipitation information and may be coupled to an automatic rain gauge 270 for receiving atmospheric precipitation information. For example, when the rain gauge 270 is located near the associated surfaces 280, 282, 286, 288 it provides information about the recent atmospheric precipitation about the areas near the associated surfaces 280, 282, 286, 288. It may be that the rain gauge 270 is located at one of the associated surfaces 280, 282, 286, 288 and then the rain gauge 270 provides information about recent atmospheric precipitation at one of the associated surfaces 280, 282, 286, 288 and, assuming that the associated surfaces 280, 282, 286, 288 are located close to each other, about an area near the associated surfaces 280, 282, 286, 288.

As indicated in FIG. 2, the atmospheric precipitation unit 230 may be coupled to a network 260, for example, the internet. Then the atmospheric precipitation unit 230 comprises also a network interface. An atmospheric precipitation database 262 from a weather information provider may also be coupled to the network 260 and the interface may obtain the atmospheric precipitation information from the atmospheric precipitation database 262. The atmospheric precipitation database 262 may store, for example, for all cities and villages, recent atmospheric precipitation data which indicates, for example, how much rain fell in the respective cities and villages during specific intervals of time, for example, during every quarter of an hour.

In another embodiment, the atmospheric precipitation unit 230 is coupled to the plurality of sensors 210, 212, 216, 218 as well and uses the received sensor signals to determine whether there is recent atmospheric precipitation.

As indicated in FIG. 2, the (optional) output interface 150 may also be coupled to the network 260. Then the output interface 150 also has a network interface. The output interface 150 may provide the warning signal 251 in the form of messages, for example in e-mails, and use the network 260 to transmit the warning signal 251 to a computer, tablet computer, laptop or display 264 of an authority that must be informed when there is a problem with the water drainage of one of the associated surfaces 280, 282, 286, 288.

Figure 3:
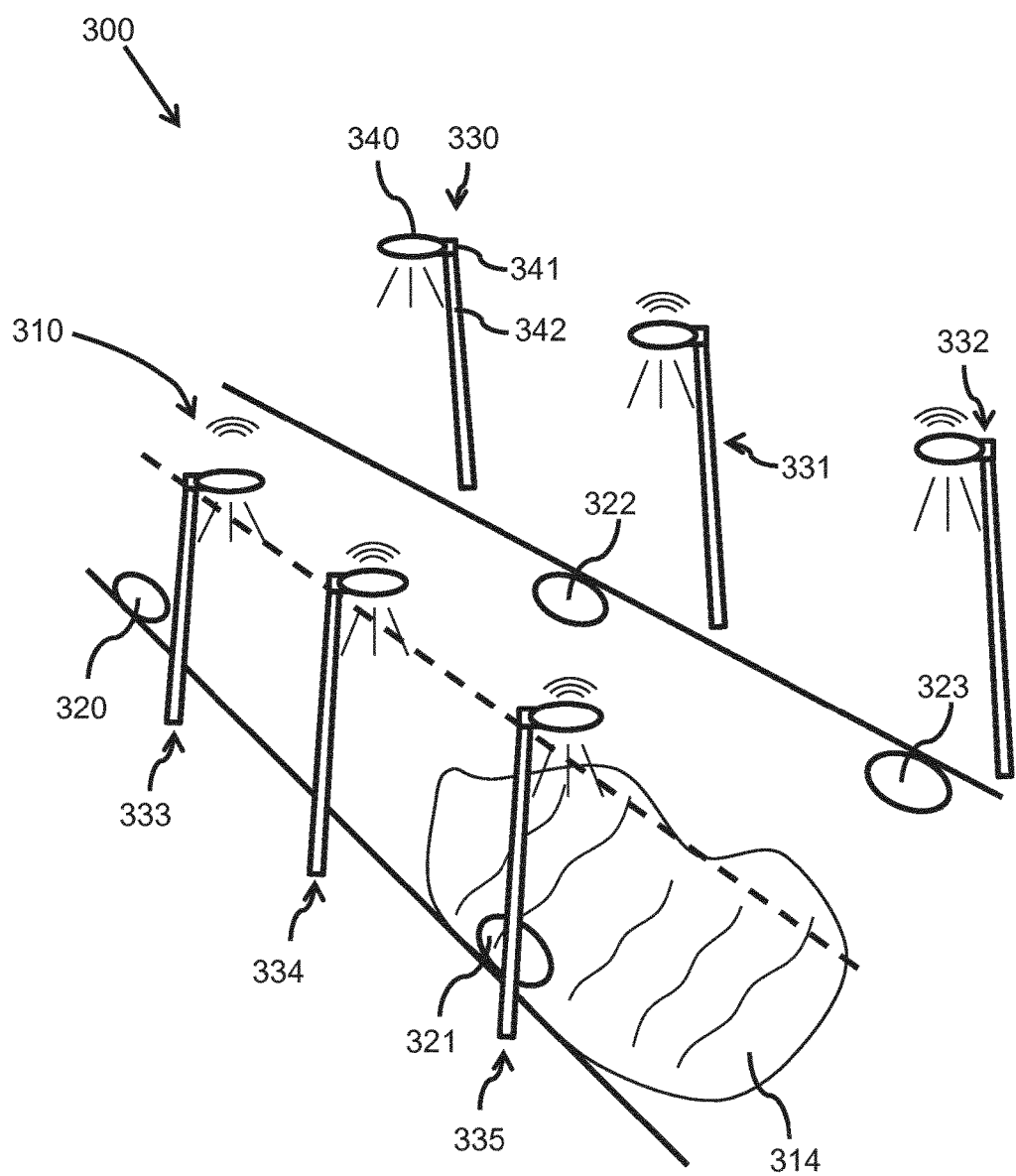

FIG. 3 schematically shows a street 310 with a street lighting system 300 in which one or more embodiments of a system for monitoring water drainage is provided. Along the street storm drains 320, 321, 322, 323 are provided. In the example of FIG. 3 one of the storm drains 321 is not functioning well and a pool 314 of water remains on the street 310. Along the street there are lighting poles 330 . . . 335 which form the street lighting system 300. In this document, the term lighting pole refers to the pole itself together with the light fixture at the top of the pole and additional optional driving circuitries provided in the pole and/or in the light fixture at the top of the pole. For lighting pole 330 distinct elements have been indicated, namely the light fixture 340, a pole 342 and an construction element 341 at the top of the pole which comprises, for example, a driving circuitry for driving the lamp in the light fixture 340.

In an example, the system 100 of FIG. 1 is provided in lighting pole 330. For example, the sensor 110 is provided in the light fixture 340 and is focused on the street below the lighting pole 330. As such, a portion of the street close to lighting pole 330 is the associated area for this sensor. Other elements of the system 100 are, for example, provided in the element 341 that also comprises the driving circuitry of the lamp. As discussed previously, then the sensor may also comprises a lamp, which may be the lamp of the lighting pole that illuminates the portion of the street 310. The driving circuitry of the lamp may also be part of the sensor if, as discussed previously, the sensor uses coded light. Such driving circuitry for emitting coded light modulates the driving signal such that a code is present in the emitted light and such that the human naked eye is not able to see the modulation of the emitted light. The interface for receiving atmospheric precipitation information may be coupled to a rain gauge that may also be integrated in the lighting pole 330 or may be coupled to a network via a wired or wireless connection. The output interface may be connected to a network via a wire or wireless connection for transmitting the warning signal to a responsible party, or the output interface may be coupled to, for example, a red-colored warning light that is provided at the exterior of the lighting pole 330.

In an example, the system 200 of FIG. 2 is provided in the street lighting system 300. For example, lighting poles 331 . . . 335 are provided with one of the sensors 210, 212 . . . 216, 218 and are provided with one of the wireless transmitters 211, 213 . . . 217, 219. One of the lighting poles 331 . . . 335 also comprises the wireless receiver 241, the storage 220, the signal generators and the atmospheric precipitation unit 230 and the output interface 150. Each sensor in the lighting poles 331 . . . 335 has an associated surface that is a portion of the street that is close to and illuminated by the respective lighting poles 331 . . . 335. For example, lighting pole 335 may detect that a pool 314 is present on the street near the lighting pole 335. If there was no recent atmospheric precipitation, as indicated by the received atmospheric precipitation information, the signal generator may detect a deviation between the predicted water presence data for the associated area of lighting pole 335 and a warning signal may be general that is submitted to the authority responsible for the maintenance of street 310. Subsequently, the responsible authority may visit the street 310 to repair or free the storm drain 321. In another embodiment, it is considered that the pool 314 on the street is too dangerous and the responsible authority may close the street 310 or activate a warning sign indicating to the users the street 310 that there is too much water present on the street 310.

Figure 4:
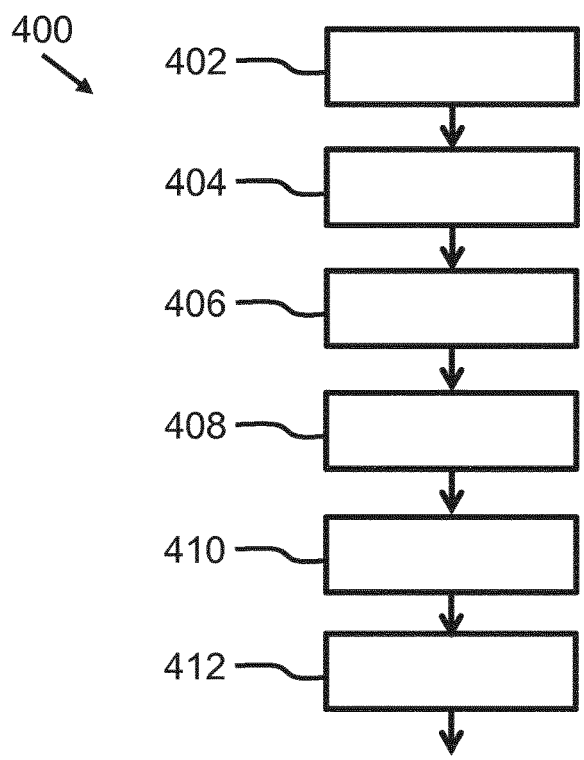

FIG. 4 schematically shows a method 400 of monitoring water drainage. The method comprises: a) receiving 402 a sensor signal being generated by a sensor, the sensor being configured to detect water presence at an associated surface and to generate a sensor signal indicating water presence at the associated surface; b) obtaining or retrieving 404 water drainage information relating to the associated surface (optionally from a storage), the water drainage information comprises characteristics of water presence on the associated surface in cases of atmospheric precipitation at the associated surface; c) obtaining or receiving 406 atmospheric precipitation information that comprises information about recent atmospheric precipitation at the associated surface and/or an area near the associated surface; d) obtaining or determining 408 predicted water presence data by applying the retrieved water drainage information to the received atmospheric precipitation information; e) comparing 410 the received sensor signal with the predicted water presence data; and f) generating 412 a warning signal indicating a problem with the water drainage in relation to the associated surface if in the comparison a deviation is detected between the received sensor signal and the predicted water presence.

The method 400 of monitoring water drainage has similar embodiments as the above discussed systems for monitoring water drainage. The embodiments of the method 400 have similar effects and advantages as the embodiments of the system. The schematically drawn method 400 shows the different stages 402 . . . 412 of the method 400 in a linear order.

Embodiments of the method 400 are not limited to the drawn linear order of the stages 402 . . . 412 in so far the different stages 402 . . . 412 do not depend on each other. Some stages may be performed in another order or may be performed in parallel. For example, before the obtaining 408 of the predicted water presence data, water drainage information is retrieved 404 and the atmospheric precipitation information is received 406. However, it is not important whether the water drainage information is retrieved 404 before the atmospheric precipitation information is received 406 or vice versa. For example, the water drainage information may be retrieved 404 in parallel to receiving 406 the atmospheric precipitation information.

Figure 5:
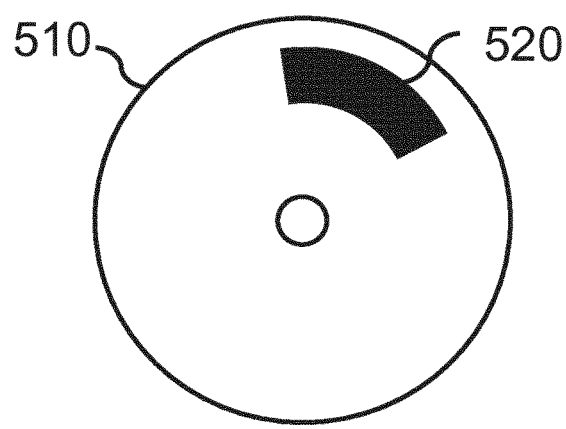

FIG. 5 schematically shows a computer program product 510. The computer program product 510 is, for example, an optical disk on which a program is stored 520. Embodiments of the program 520 are operative to cause a processor to perform an embodiment of the above discussed methods of monitoring water drainage. The program may comprise comprising instructions which cause the processor, when the program being loaded into a computer comprising the processor, to perform the above discussed method monitoring water drainage. The processor may be a general purpose processor and the processor may be a dedicated processor that may also have some hardware specifically configured to perform some of the stages of the method more efficiently. Embodiments of the computer program product 510 are not limited to optical disks. The program may also be provided in or at another carrier or may be provided as a downloadable program. For example, the carrier may include a storage medium, such as a ROM, for example, a CD ROM or a semiconductor ROM, or a magnetic recording medium, for example a floppy disc or hard disk. Further the carrier may be a transmissible carrier such as an electrical or optical signal, which may be conveyed via electrical or optical cable or by radio or other means. When the program is embodied in such a signal, the carrier may be constituted by such cable or other device or means. Alternatively, the carrier may be an integrated circuit in which the program is embedded, the integrated circuit being adapted for performing, or for use in the performance of, the relevant method.

In summary, this document provides a system for and a method of monitoring water drainage. The system for monitoring water drainage comprising a sensor interface, a storage, an atmospheric precipitation unit and a signal generator. The sensor detects whether water is present at an associated surface and generates a sensor signal. The storage stores water drainage information that relates to the associated surface and comprises characteristics of water presence on the associated surface in cases of atmospheric precipitation. The atmospheric precipitation unit receives recent atmospheric precipitation information. The signal generator i) obtains predicted water presence data by applying the water drainage information retrieved from the storage to the atmospheric precipitation information, ii) compares the sensor signal received from the sensor with the predicted water presence data, iii) generates a warning signal indicating a problem with the water drainage if in the comparison a too large deviation is detected.

It is to be noted that the invention may be implemented in hardware and/or software, using programmable components. A method for implementing the invention has the steps corresponding to the functions defined for the system as described with reference to FIG. 1.

It will be appreciated that the above description for clarity has described embodiments of the invention with reference to different functional units and processors. However, it will be apparent that any suitable distribution of functionality between different functional units or processors may be used without deviating from the invention. For example, functionality illustrated to be performed by separate units, processors or controllers may be performed by the same processor or controllers. Hence, references to specific functional units are only to be seen as references to suitable means for providing the described functionality rather than indicative of a strict logical or physical structure or organization. The invention can be implemented in any suitable form including hardware, software, firmware or any combination of these.

It is noted, that in this document the word 'comprising' does not exclude the presence of other elements or steps than those listed and the word 'a' or 'an' preceding an element does not exclude the presence of a plurality of such elements, that any reference signs do not limit the scope of the claims, that the invention may be implemented by means of both hardware and software, and that several 'means' or 'units' may be represented by the same item of hardware or software, and a processor may fulfill the function of one or more units, possibly in cooperation with hardware elements. Further, the invention is not limited to the embodiments, and the invention lies in each and every novel feature or combination of features described above or recited in mutually different dependent claims.

The invention claimed is:

1. A system for monitoring water drainage, the system comprising:
   a sensor interface for obtaining a sensor signal from a sensor, the sensor being configured to detect water presence at an associated surface and configured to generate the sensor signal indicative of water presence at the associated surface,
   a storage for storing water drainage information relating to the associated surface, the water drainage information comprising characteristics of water presence on the associated surface due to atmospheric precipitation at the associated surface,
   an atmospheric precipitation unit for obtaining atmospheric precipitation information comprising information about recent atmospheric precipitation in the vicinity of the associated surface,
   a signal generator coupled to the sensor interface, the storage and the atmospheric precipitation unit, the signal generator being configured to:
   i) obtain predicted water presence data by applying the water drainage information retrieved from the storage to the atmospheric precipitation information received from the atmospheric precipitation unit,
   ii) compare the sensor signal received from the sensor interface with the predicted water presence data,
   iii) generate a warning signal indicating a problem with the water drainage in relation to the associated surface if in the comparison a deviation is detected between the sensor signal and the predicted water presence.

2. A system according claim 1 comprising:
a plurality of sensors coupled to the sensor interface, the sensors are configured to detect water presence at associated surface, the sensors are individually associated with a respective one of the associated surfaces, and
wherein
the storage is for storing water draining information relating to the associated surfaces,
the atmospheric precipitation unit is for obtaining atmospheric precipitation information comprising information about recent atmospheric precipitation in the vicinity of the associated surfaces,
the signal generator is configured to obtain predicted water presence data for the associated surfaces, compare the sensor signals of the plurality of sensors with the predicted water presence data, and generate the warning signal if in the comparison a deviation is detected between one of the sensor signals and the predicted water presence, the warning signal indicating a problem with the water drainage in relation to the associated surface for which the deviation is detected.

3. A system according to claim 1, wherein the predicted water presence comprises at least one of: an expected duration of the presence of water on the associated surface, an expected amount of water being present on the associated surface, an expected amount of water being present on the associated surface, as a function of time.

4. A system according to claim 1, wherein
the sensor is configured to detect an amount of water on the associated surface and the sensor signal indicates an amount of water being present at the associated surface.

5. A system according to claim 1 wherein the storage is also coupled to the sensor interface, and the storage is configured to store a history of the sensor signal of at least one sensor.

6. A system according to claim 1 wherein the storage is also coupled to the atmospheric precipitation unit for receiving atmospheric precipitation information and the storage is configured to store a history of the atmospheric precipitation information.

7. A system according to claim 5 wherein the signal generator is configured to retrieve also history information of at least one sensor signal and the atmospheric precipitation information from the storage and take the history information into account in the obtaining of the predicted water presence data and the comparing of the sensor signal with the predicted water presence data.

8. A system according to claim 1, wherein the atmospheric precipitation unit is further configured to obtain additional weather information in relation to the associated surface and/or of an area near the associated surface, the additional weather information is, for example, an air temperature, an amount of wind, a humidity, an atmospheric pressure, a sunshine duration, a sunshine intensity and/or an evaporation index.

9. A system according to claim 1 wherein at least one sensor comprises at least one of:
a camera for obtaining images of the associated surface and an image processing circuit for recognizing water on the associated surface in the obtained images,
a video camera for obtaining a video stream of the associated surface and a video processing circuit for recognizing water on the associated surface in the obtained video stream,
an infrared camera for obtaining infrared images and a processing circuit for detecting the presence of water based on temperature characteristics being present in the infrared images,
a light source in combination with a light sensor to measure the amount of reflected light and a detecting circuit for detecting the presence of water based on characteristics of the reflected light,
a microphone for obtaining an audio stream of the environment of the associated surface and audio processing circuit for detecting the presence of water on the associated surface based on characteristics of sounds in the obtained audio stream,
an electrical resistance sensor being provided in or at the associated surface and a detection circuit for detecting an electrical resistance of the associated surface and for detecting the presence of water on the associated surface based on characteristics of the detected electrical resistance of the associated surface,
a pressure sensor provided in or below the associated surface and a detection circuit for detecting a pressure on the associated surface and for detecting water present on the associated surface on basis of characteristics of the detected pressure on the associated surface, and
a humidity sensor provided close to the associated surface for detecting the presence of water on the associated surface based on a detected humidity value.

10. A system according to claim 1, wherein at least one sensor comprises:
a light source for emitting coded light,
a driving circuit for providing a modulated power signal to the light source and for being positioned at a first location with respect to the associated surface, the modulated power signal being modulated according to a code,
a light sensor for being positioned at a second location with respect to the associated surface and for detecting light reflected by the associated surface, the reflected light includes reflected coded light,
a detection circuit for detecting the presence of water on basis of characteristics of detected reflected coded light.

11. A system according to claim 1, comprising an outdoor luminaire, such as, for example, an outdoor lighting pole wherein the outdoor luminaire comprises at least one sensor.

12. A system according to claim 1, the system further comprising:
at least one sensor signal receiver being coupled to the signal generator, and
at least one sensor signal transmitter coupled to at least one sensor for transmitting the sensor signal of the at least one sensor to the signal generator.

13. A system according to claim 1, wherein
the storage is further configured to store one or more importance characteristics in relation to the associated surface, the importance characteristics relating to how important a possible water drainage problem of the associated surface is,
the signal generator is further configured to obtain the importance characteristics from the storage,
the signal generator is configured to take into account the importance parameter in at least one of a) the comparing of the sensor signal with the predicted water presence data for determining whether a deviation is detected b) the generation of the warning signal for optionally prioritizing the generation of the warning signal and optionally including an importance value in the generated warning signal.

14. Method of monitoring water drainage, the method comprising:
- receiving a sensor signal being generated by a sensor, the sensor being configured to detect water presence at an associated surface and to generate a sensor signal indicating water presence at the associated surface,
- obtaining water drainage information relating to the associated surface, the water drainage information comprising characteristics of water presence on the associated surface in cases of atmospheric precipitation at the associated surface,
- obtaining atmospheric precipitation information comprising information about recent atmospheric precipitation at at least one of: the associated surface and an area near the associated surface,
- determining predicted water presence data by applying the retrieved water drainage information to the received atmospheric precipitation information,
- comparing the received sensor signal with the predicted water presence data, and
- generating a warning signal indicating a problem with the water drainage in relation to the associated surface if in the comparison a deviation is detected between the received sensor signal and the predicted water presence.

15. Computer program product for monitoring water drainage, which program is operative to cause a processor to perform the method as claimed in claim 14.

* * * * *